United States Patent
Leman et al.

(10) Patent No.: US 11,754,217 B2
(45) Date of Patent: Sep. 12, 2023

(54) TELESCOPING MONITOR MOUNT

(71) Applicant: CKnapp Sales, Inc., Goodfield, IL (US)

(72) Inventors: Aaron Leman, Morton, IL (US); Jakob Douglas, Washington, IL (US); Micah Fehr, Danvers, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 0 days.

(21) Appl. No.: 17/565,436

(22) Filed: Dec. 29, 2021

(65) Prior Publication Data

US 2023/0160522 A1    May 25, 2023

Related U.S. Application Data

(60) Provisional application No. 63/282,677, filed on Nov. 23, 2021.

(51) Int. Cl.
*F16M 11/20* (2006.01)
*F16M 13/02* (2006.01)

(52) U.S. Cl.
CPC ..... *F16M 11/2085* (2013.01); *F16M 11/2014* (2013.01); *F16M 13/02* (2013.01); *F16M 2200/028* (2013.01); *F16M 2200/068* (2013.01)

(58) Field of Classification Search
CPC ........... F16M 11/2085; F16M 11/2014; F16M 2200/028; F16M 2200/068; F16M 13/02
See application file for complete search history.

(56) References Cited

U.S. PATENT DOCUMENTS

| | | | | |
|---|---|---|---|---|
| 5,904,328 A | * | 5/1999 | Leveridge | F16M 11/10 248/922 |
| D477,606 S | * | 7/2003 | Theis | D14/451 |
| 7,529,083 B2 | * | 5/2009 | Jeong | F16M 11/105 600/407 |
| 8,102,331 B1 | * | 1/2012 | Moscovitch | G09F 9/35 345/1.3 |
| D660,308 S | * | 5/2012 | Huang | F16M 11/24 D14/452 |
| 8,282,052 B2 | * | 10/2012 | Huang | F16M 11/24 248/125.1 |

(Continued)

FOREIGN PATENT DOCUMENTS

WO    WO-2013165562 A1 * 11/2013 ............. F16M 11/06

OTHER PUBLICATIONS

"Articulating Monitor Desk Stand: MI-27810;" Accessed online at "https://mount-it.com/products/mount-it-adjustable-dual-monitor-desk-stand-mi-2781" on Sep. 21, 2021; 2 pages; Mount-It!; Poway, California.

(Continued)

*Primary Examiner* — Eret C McNichols
(74) *Attorney, Agent, or Firm* — Lund IP, PLLC

(57) ABSTRACT

A telescoping monitor mount includes a center post, a slidable bracket over the center post, a first telescoping arm connected to the slidable bracket, a second telescoping arm connected to the slidable bracket, a first monitor mounting bracket connected to an end of the first telescoping arm opposite the slidable bracket, and a second monitor mounting bracket connected to an end of the second telescoping arm opposite the slidable bracket.

18 Claims, 6 Drawing Sheets

(56) References Cited

U.S. PATENT DOCUMENTS

| | | | | |
|---|---|---|---|---|
| 8,342,462 B2* | 1/2013 | Sapper | F16M 11/2057 | 248/920 |
| 8,717,506 B2* | 5/2014 | Austin | F16M 11/125 | 348/836 |
| 8,757,569 B2* | 6/2014 | Chen | F16M 11/2014 | 248/225.11 |
| 9,089,216 B2* | 7/2015 | Liu | F16M 11/22 | |
| 9,247,861 B2* | 2/2016 | Kan | H04N 5/655 | |
| 9,746,124 B2* | 8/2017 | Smed | F16M 11/10 | |
| 9,803,795 B2* | 10/2017 | Brandt | G06F 1/1601 | |
| 9,958,108 B2* | 5/2018 | Bowman | F16M 11/18 | |
| 10,066,785 B1* | 9/2018 | Chen | F16M 11/14 | |
| 10,323,791 B1* | 6/2019 | Liu | F16B 2/065 | |
| D877,745 S * | 3/2020 | Knapp | F16M 11/2064 | D14/452 |
| 10,753,531 B2* | 8/2020 | Huang | F16M 11/08 | |
| 10,768,663 B2* | 9/2020 | Carson | F16M 11/041 | |
| D936,053 S * | 11/2021 | Chen | G01S 13/931 | D14/375 |
| 11,175,381 B2* | 11/2021 | Wang | G01S 13/931 | |
| D938,959 S * | 12/2021 | Xie | F16M 11/08 | D14/452 |
| 11,500,079 B2* | 11/2022 | Lai | G01S 17/931 | |
| 2004/0011938 A1* | 1/2004 | Oddsen, Jr. | F16M 11/2071 | 248/157 |
| 2007/0084978 A1* | 4/2007 | Martin | F16M 11/2064 | 248/176.1 |
| 2007/0097609 A1* | 5/2007 | Moscovitch | G06F 3/1438 | 361/679.04 |
| 2007/0205340 A1* | 9/2007 | Jung | F16M 11/105 | 248/917 |
| 2008/0117578 A1* | 5/2008 | Moscovitch | F16M 11/2085 | 361/679.04 |
| 2009/0134285 A1* | 5/2009 | Huang | F16M 11/2014 | 248/124.1 |
| 2009/0173847 A1* | 7/2009 | Dittmer | F16M 11/2014 | 248/125.1 |
| 2010/0128423 A1* | 5/2010 | Moscovitch | F16M 11/14 | 361/679.01 |
| 2012/0056050 A1* | 3/2012 | Huang | F16M 11/2064 | 248/122.1 |
| 2013/0320170 A1* | 12/2013 | Smed | F16M 11/2014 | 248/274.1 |
| 2014/0245932 A1* | 9/2014 | McKenzie, III | A47B 21/02 | 108/50.01 |
| 2016/0281915 A1* | 9/2016 | Bowman | F16M 13/02 | |
| 2018/0328533 A1* | 11/2018 | Carrasquillo | F16M 11/16 | |
| 2022/0037758 A1* | 2/2022 | Kim | F16M 11/08 | |

OTHER PUBLICATIONS

"Hex Monitor Desk Stand: Instruction Manual;" Jul. 14, 2021; 8 pages; VIVO; Goodfield, Illinois.

"HUANUO Dual Monitor Stand for 17-32 inch LCD Screens, 26lbs Heavy-Duty per Arm, Desk Clamp Arms for Computer Screens, Adjustable Monitor Mount with Swivel and Tilt," Website "https://www.amazon.com/HUANUO-Monitor-Height-Adjustable-Screens/dp/B08CXTT91R/", 8 pages, Accessed Sep. 21, 2021.

"Installation Instructions: Product# 100-D16-B03—Triple Desk Stand;" Oct. 2008; 1 page; Ergotech Group, Inc.; Elmsford, New York.

"Pneumatic Arm Triple Monitor Desk Mount with Pull Handle: Instruction Manual;" Mar. 5, 2020; 8 pages; VIVO; Goodfield, Illinois.

\* cited by examiner

TELESCOPING MONITOR MOUNT

RELATED APPLICATION

This application claims the benefit of and priority to U.S. Provisional Application No. 63/282,677, filed Nov. 23, 2021, which is hereby incorporated by reference.

TECHNICAL FIELD

This disclosure relates to monitor mounts.

BRIEF SUMMARY

Monitor mounts disclosed herein facilitate mounting a horizontal array including multiple monitors to a common stand. The disclosed examples including telescoping horizontal frame members to facilitate adjusting the relative positions of multiple monitors mounted to the common stand while also providing a stable compact frame suitable for supporting the monitors.

In one example, a telescoping monitor mount includes a center post, a slidable bracket over the center post, a first telescoping arm connected to the slidable bracket, a second telescoping arm connected to the slidable bracket, a first monitor mounting bracket connected to an end of the first telescoping arm opposite the slidable bracket, and a second monitor mounting bracket connected to an end of the second telescoping arm opposite the slidable bracket.

In another example, an assembly includes a telescoping monitor mount. Telescoping monitor mount includes a center post, a slidable bracket over the center post, a first telescoping arm connected to the slidable bracket, a second telescoping arm connected to the slidable bracket, a first monitor mounting bracket connected to an end of the first telescoping arm opposite the slidable bracket, and a second monitor mounting bracket connected to an end of the second telescoping arm opposite the slidable bracket. The assembly further includes a first monitor mounting bracketed to the first monitor mounting bracket, and a second monitor mounting bracketed to the second monitor mounting bracket.

DETAILED DESCRIPTION

Figure 1A:
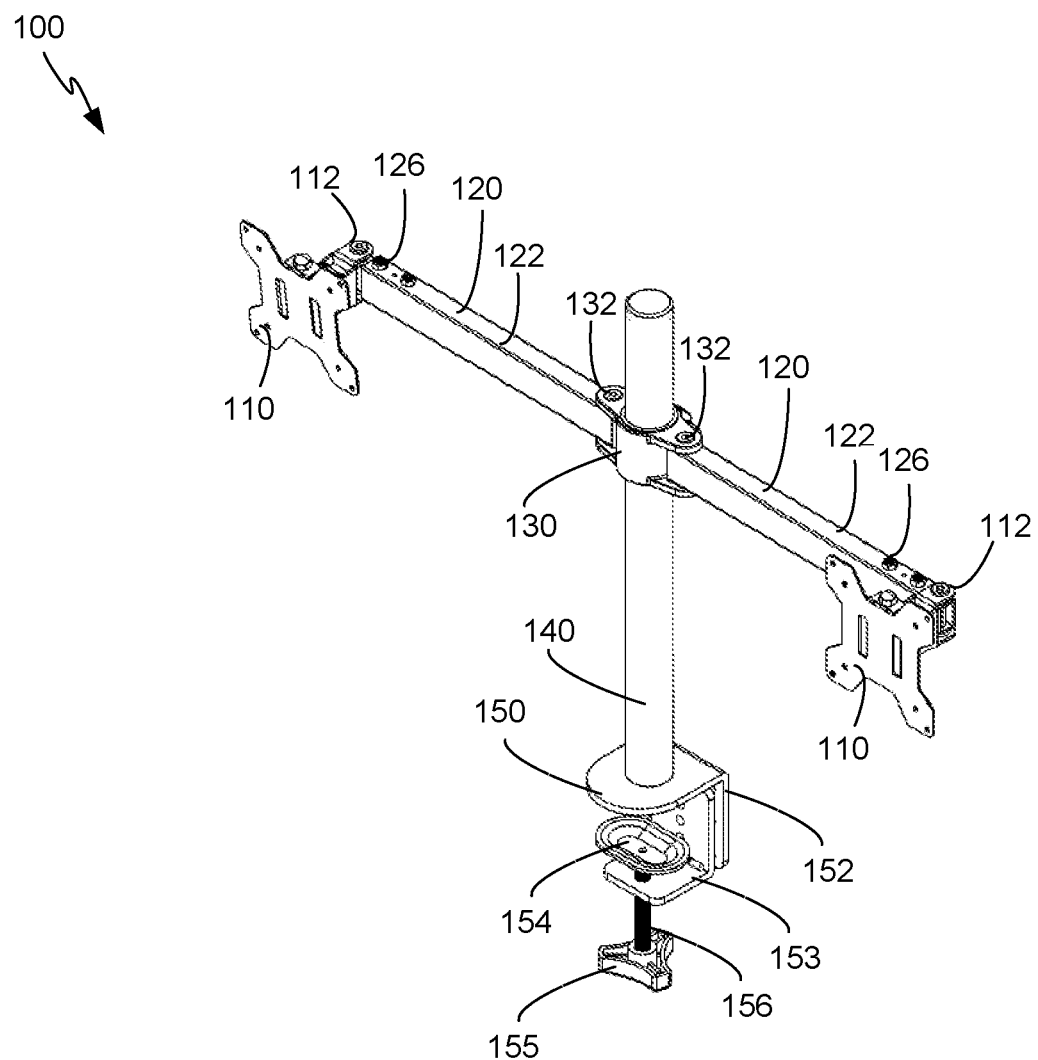
FIGS. 1A-1C illustrate a telescoping monitor mount with two straight telescoping arms.
Figure 1B:
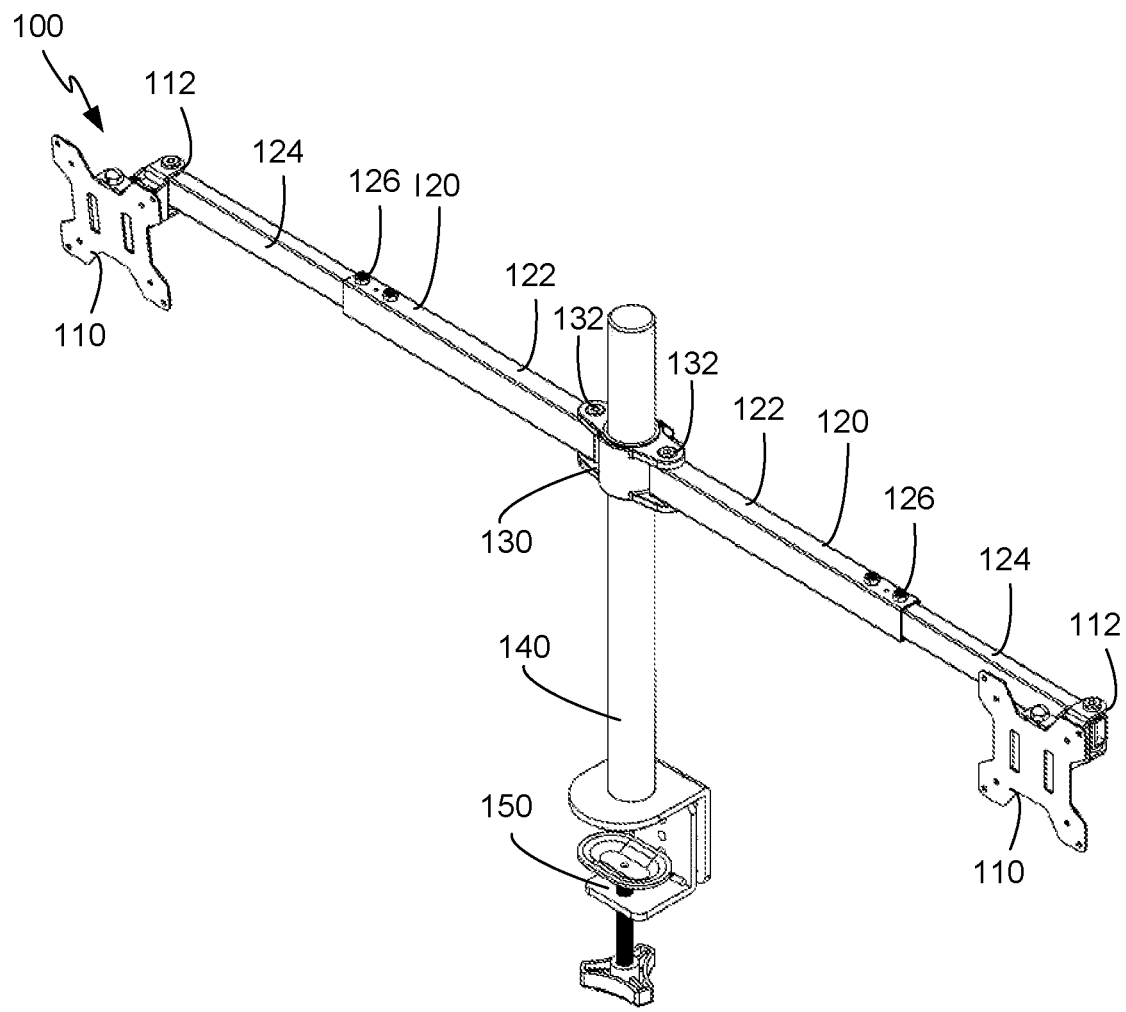
Figure 1C:
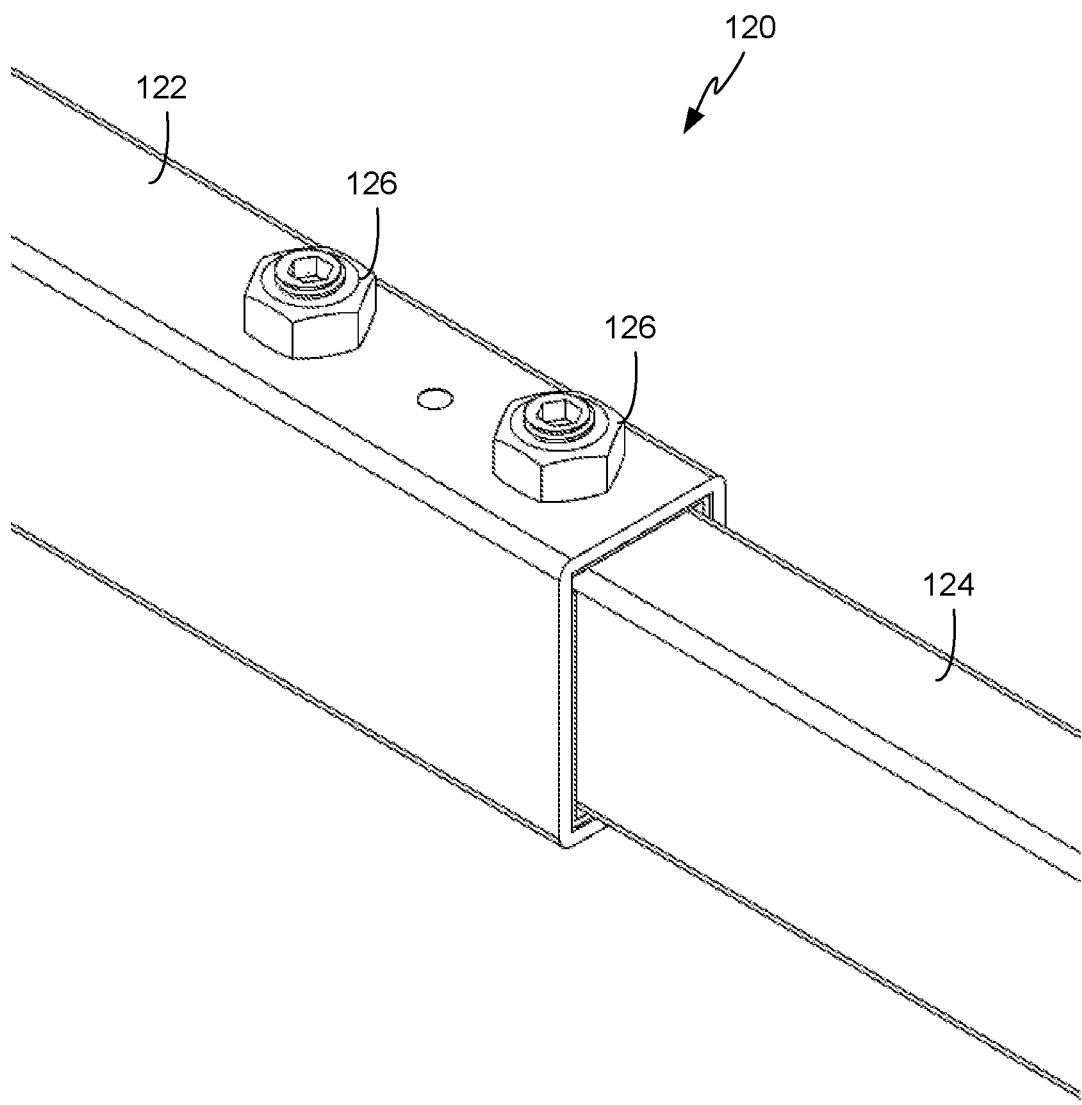

FIGS. 1A-1C illustrate a telescoping monitor mount 100. Telescoping monitor mount 100 includes two telescoping arms 120 extending on either side of a center post 140 with two monitor mounting brackets 110 mounted to the ends of the two telescoping arms 120. Specifically, FIG. 1A illustrates a perspective view of telescoping monitor mount 100 with telescoping arms 120 in collapsed positions, whereas FIG. 1B illustrates a perspective view of telescoping monitor mount 100 with telescoping arms 120 in extended positions. FIG. 1C illustrates a close-up view of a portion of a telescoping arm 120 showing an outer tube 122, an inner tube 124 slidable within the outer tube 122 and two set screws 126.

In the example of telescoping monitor mount 100, center post 140 is a straight tubular post with a round cross-section. In various examples, center post 140 may be 300 to 900 millimeters (mm), such as about 430 mm long. In the same or different examples, center post 140 may be formed from a thin-walled metal tube, such as a steel or aluminum tube. In other examples, center post 140 may be a rectangular tubular post, or non-tubular post, such as a u-channel post or extruded metal post.

Slidable bracket 130 fits over center post 140 and facilitates a selectable height for telescoping arms 120. In this manner, center post 140 represents a common stand for both telescoping arms 120. In the example of telescoping monitor mount 100, slidable bracket 130 includes a circumferential clamp mechanism for fixation to center post 140. In other examples, slidable bracket 130 may include a setscrew or other adjustable fixation mechanism.

Two telescoping arms 120 are pivotably connected to slidable bracket 130 by two pivot points 132. In the example of telescoping monitor mount 100, pivot points 132 each include pivot pin extending through holes in slidable bracket 130 and the corresponding telescoping arm 120. In other examples, pivot points 132 may include a hinge, a four-bar linkage, or other pivot mechanism.

Each telescoping arm 120 includes an outer tube 122, an inner tube 124 slidable within the outer tube 122, and two set screws 126 extending through a threaded hold in the outer tube 122. Set screws 126 selectively contact the inner tube 124 to fix the extension of the inner tube 124 relative to the outer tube 122.

The total length of telescoping arms 120 is selected according to the maximum size desired for mounting monitors. For example, for monitors up to 32 inches, each of telescoping arms 120 may have a maximum extended length of at least 800 mm, which would provide a minimum length of about 420 mm, with a range of adjustment of about 380 mm. In one particular example, each of telescoping arms 120 has a maximum extended length of 832 mm with a minimum length of 437 mm, which would be suitable for displays ranging from 19 inches to 34 inches. In various examples, telescoping arms 120 may facilitate a range of adjustment between 200 mm and 500 mm.

The construction of outer tube 122 and inner tube 124 is selected to support the weight of mounted monitors as well as provide limited bending of telescoping arms 120 at the maximum extended length of telescoping arms 120. The outer diameter of inner tube 124 is selected to be slightly smaller than the inner diameter of outer tube 122. For example, the outer diameter of inner tube 124 may be within 1 mm, such as within 0.5 mm of the inner diameter of outer tube 122. In various examples, outer tube 122 may have tube size of 25 mm by 15 mm by 1.5 mm to 51 mm by 25 mm by 2.5 mm, such as a tube size of 30 mm by 20 mm by 2 mm. In the same examples, inner tube 124 may have tube size of 20 mm by 10 mm by 1.5 mm to 45 mm by 19 mm by 2.5 mm, such as a tube size of 25.5 mm by 15.5 mm by 2 mm. In yet further examples, telescoping arms 120 may be formed from nesting bars, such as bars with u-shaped channels rather than outer tube 122 and inner tube 124.

Telescoping monitor mount 100 further includes two monitor mounting brackets 110 connected to ends of the two telescoping arms 120 opposite the slidable bracket 130 by pivots 112 on the end of inner tubes 124. In some examples, the mounting holes of monitor mounting brackets 110 may conform to a VESA standard display mount. Such VESA standard display mounts include rectangular hole patterns such as 50×20 mm, 75×35 mm, 75×75 mm, 100×100 mm, 200×100 mm, 400×200 mm, 600×400 mm, and others in 200 mm increments.

Telescoping monitor mount 100 includes a clamp 150 connected to the center post 140 for securing the center post 140 to a desktop or other worksurface (not shown) in an upright orientation. Slidable bracket 130 may be selectively positioned on center post 140 to select a height of monitor mounting brackets 110 relative to clamp 150 and the desktop.

Clamp 150 includes an L-bracket 152 attached to the end of center post 140. L-bracket 152 is configured to register with the top side of a worksurface. Clamp 150 further includes L-bracket 153, which is attached to L-bracket 152 to form a C-shaped bracket. L-bracket 153 may be attached with rivets, bolts, or other techniques. In other examples, L-brackets 152, 153 may be a unitary component. Clamp member 154 is configured to register with the bottom side of the worksurface. Clamp member 154 includes a threaded shaft 156 that extends through a threaded hole in L-bracket 153. Handle 155 is at the end of threaded shaft 156 and allows a user to adjust the spacing of clamp member 154 relative to L-bracket 152 in order to secure clamp 150 to the worksurface.

While telescoping monitor mount 100 includes clamp 150 for connection to a worksurface, other mounting techniques are also possible. For example, center post 140 may include a base sized to fit with in a hole in a worksurface, such as a standard 2-inch cable hole.

As another example, center post 140 may include a ceiling mount to facilitate hanging from a ceiling instead of clamp 150. In such examples, it is important for such a ceiling mount to provide sufficient attachment strength to a ceiling to hold the weight of telescoping monitor mount 100 and displays mounted thereon. Such a ceiling mount may include a plate with holes. The plate may be configured for attachment to a standard ceiling fan fixture box or sized to facilitate attachment to structural framing members. In various examples, the holes may be spaced at least 16 inches or at least 24 inches to facilitate direct attachment to structural framing elements behind a finished ceiling surface.

Figure 2A:
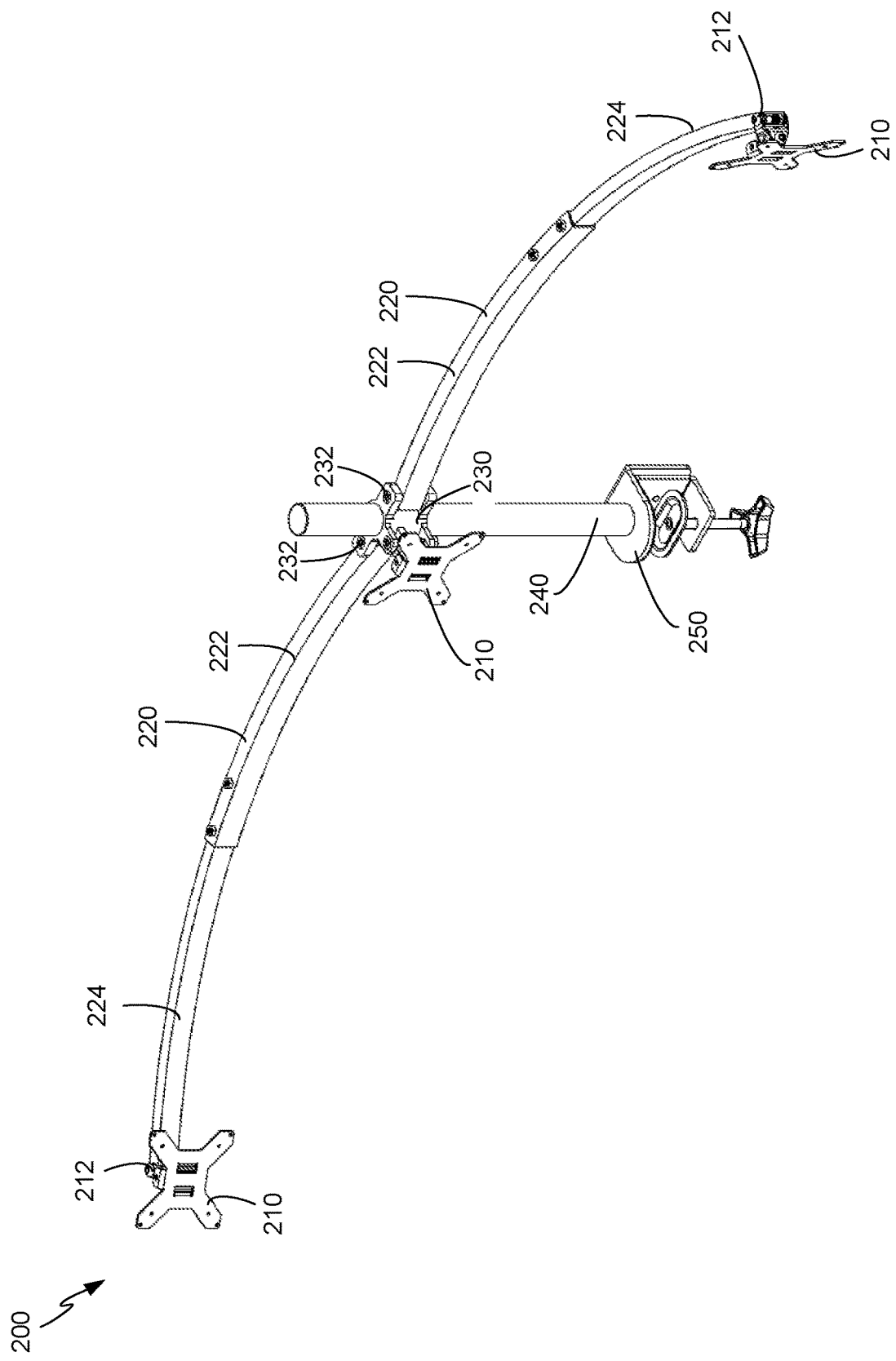
FIGS. 2A-2C illustrate a telescoping monitor mount with two curved telescoping arms.
Figure 2B:
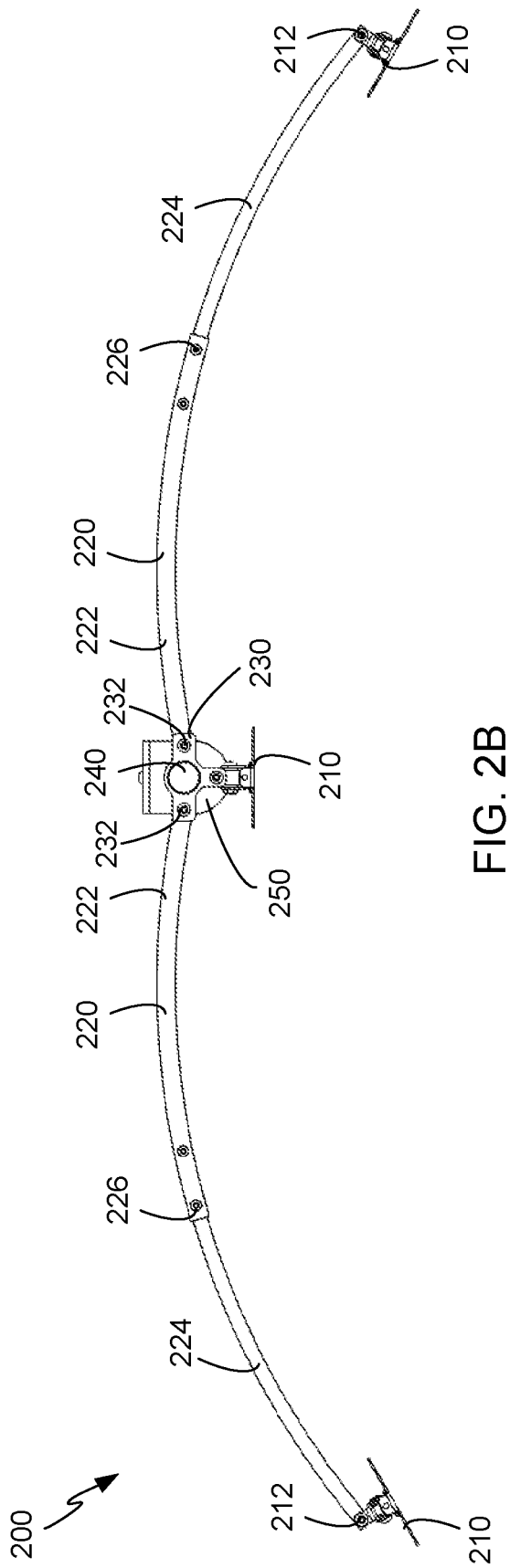
Figure 2C:
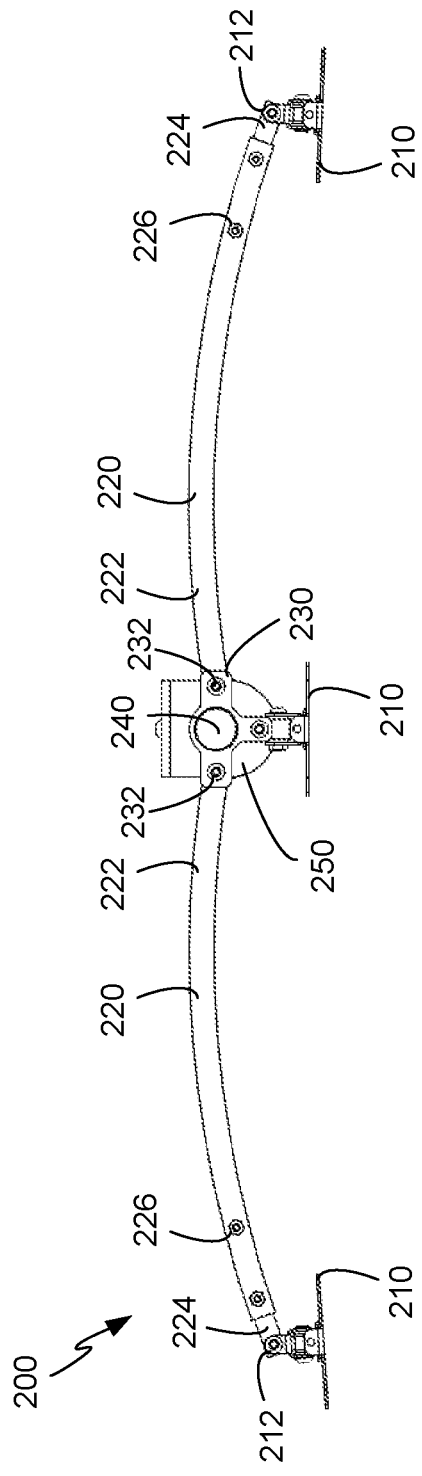
Figure 3:
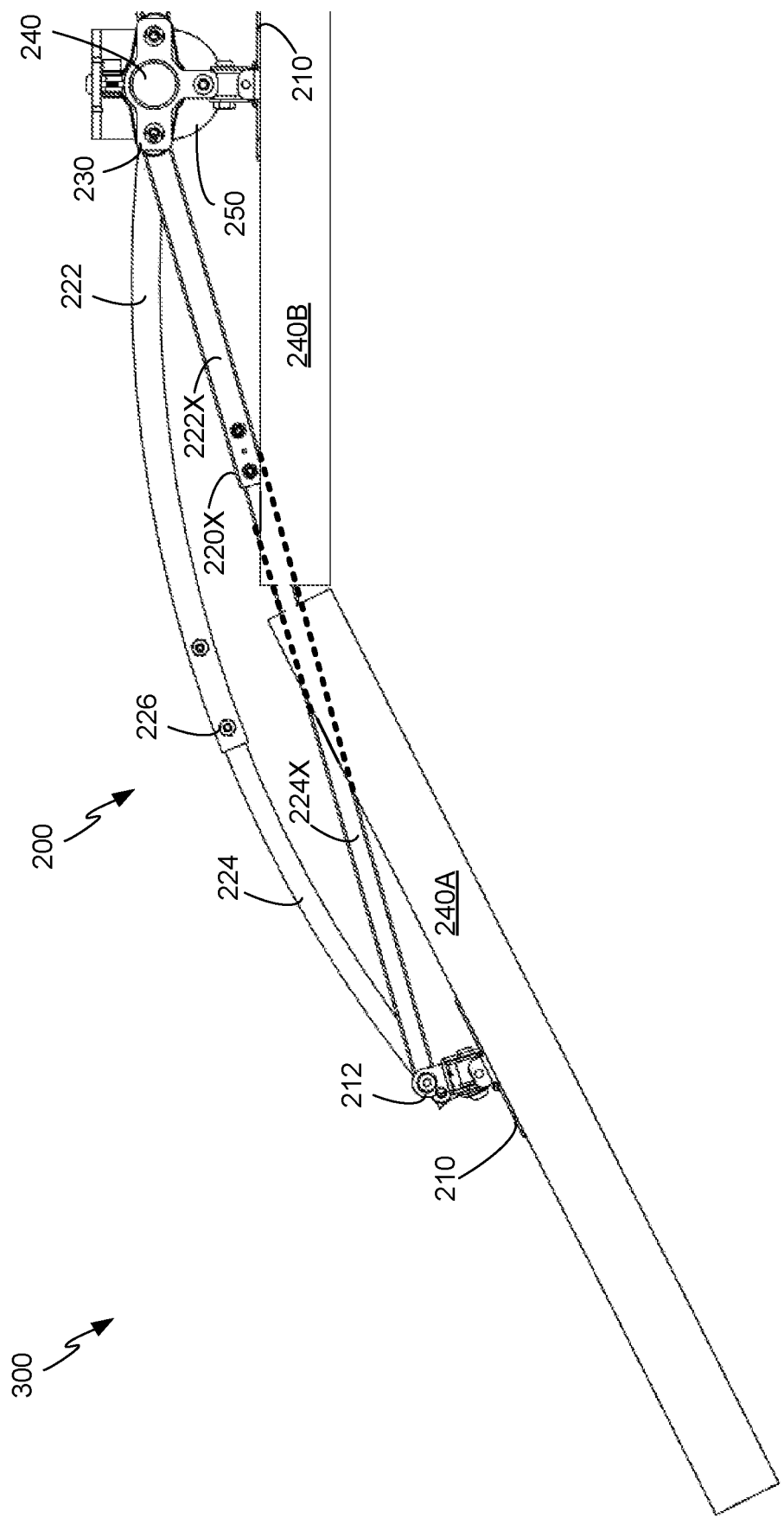
FIG. 3 illustrates portions of the telescoping monitor mount of FIGS. 2A-2C with monitors mounted thereon.

FIGS. 2A-2C illustrate a telescoping monitor mount 200. Telescoping monitor mount 200 includes two curved telescoping arms 220 extending on either side of a center post 240 with two monitor mounting brackets 210 mounted to the ends of the two telescoping arms 220. Specifically, FIG. 2A illustrates a perspective view of telescoping monitor mount 200 with telescoping arms 220 in extended positions. FIG. 2B illustrates a top view of telescoping monitor mount 200 with telescoping arms 220 in extended positions, and FIG. 2C illustrates a top view of telescoping monitor mount 200 with telescoping arms 220 in collapsed positions. As shown in FIG. 3, the curve of the telescoping arm 220 facilitate increase viewing angle adjustability for monitors 240A, 240B without interference from telescoping arm 220.

Telescoping monitor mount 200 is substantially similar to telescoping monitor mount 100 except that telescoping arms 220 are curved rather than straight. In addition, telescoping monitor mount 200 includes a third monitor mounting bracketing bracket 210 pivotably connected to the center post such 240 that the third monitor mounting bracketing bracket 210 is between the monitor mounts on the ends of telescoping arms 220.

Telescoping monitor mount 200 includes a center post 240 and a slidable bracket 230 over the center post. Two telescoping arms 220 are pivotally connected to slidable bracket 230 by two pivots 232. Each telescoping arm 220 includes an outer tube 222, an inner tube 224 slidable within the outer tube 222 and two set screws 226 extending through a threaded hold in the outer tube 222. Set screws 226 selectively contact the inner tube 224 to fix the extension of the inner tube 224 relative to the outer tube 222.

Telescoping monitor mount 200 further includes two monitor mounting brackets 210 connected to ends of the two telescoping arms 220 opposite the slidable bracket 230 by pivots 212 on the end of inner tubes 224. In some examples, the mounting holes of monitor mounting brackets 210 may conform to a VESA standard display mount. Such VESA standard display mounts include rectangular hole patterns such as 50×20 mm, 75×35 mm, 75×75 mm, 200×200 mm, 200×200 mm, 400×200 mm, 600×400 mm and others in 200 mm increments.

Telescoping monitor mount 200 includes a clamp 250 connected to the center post 240 for securing the center post 240 to a desktop (not shown) in an upright orientation. Slidable bracket 230 may be selectively positioned on center post 240 to select a height of monitor mounting brackets 210 relative to clamp 250 and the desktop.

The two telescoping arms 220 are curved in the same plane and direction. Outer tubes 222 and inner tubes 224 form coincident circular curves such that inner tubes 224 are slidable within the respective outer tubes 222 along the coincident circular curve.

As shown in FIG. 3, the curvature of telescoping arms 220 is selected to provide clearance for monitors mounted to mounting brackets 210. In some examples, the curvature of curvature of telescoping arms 220 may have a center line radius (CLR) of between 850 mm to 1000 mm, such as about 900 mm CLR. Any suitable manufacturing techniques may be used to form the curvature of outer tubes 222 and inner tubes 224. For example, a tube bender or a press may be used to bend a straight tube to the proper curvature, optionally with a bending gauge. As another example, outer tubes 222 and inner tubes 224 may be metal castings formed with the desired curvature.

FIG. 3 illustrates a portion of an assembly 300 including telescoping monitor mount 200 and three monitors mounted to monitor mounting brackets 210, although only two monitors 240A, 240B are visible. As shown in FIG. 3, the curves of outer tubes 222 and inner tubes 224 combine to facilitate increase viewing angle adjustability for monitors 240A, 240B without interference from telescoping arm 220. In contrast, a straight telescoping arm 220X with a straight outer tuber 222X and a straight inner tube 224X would not allow monitors 240A, 240B to be angled as shown.

The specific techniques for telescoping monitor mounts, including techniques described with respect to monitor mounts 100, 200, are merely illustrative of the general inventive concepts included in this disclosure as defined by the following claims.

What is claimed is:
1. A telescoping monitor mount comprising:
a center post;
a slidable bracket over the center post;
a first telescoping arm connected to the slidable bracket;
a second telescoping arm connected to the slidable bracket;
a first monitor mounting bracket connected to an end of the first telescoping arm opposite the slidable bracket; and
a second monitor mounting bracket connected to an end of the second telescoping arm opposite the slidable bracket, wherein the first and second monitor mounting brackets each include mounting holes that conform to a VESA standard mount.

2. The telescoping monitor mount of claim 1, wherein the first telescoping arm includes:
   an outer tube;
   an inner tube slidable within the outer tube; and
   a set screw extending through a threaded hold in the outer tube and selectively contacting the inner tube to fix the extension of the inner tube relative to the outer tube.

3. The telescoping monitor mount of claim 1, further comprising:
   a first pivot between the first monitor mounting bracket and the first telescoping arm; and
   a second pivot between the second monitor mounting bracket and the second telescoping arm.

4. A telescoping monitor mount comprising:
   a center post;
   a slidable bracket over the center post;
   a first telescoping arm connected to the slidable bracket;
   a second telescoping arm connected to the slidable bracket;
   a first monitor mounting bracket connected to an end of the first telescoping arm opposite the slidable bracket;
   a second monitor mounting bracket connected to an end of the second telescoping arm opposite the slidable bracket; and
   a clamp connected to the post for securing the post to a desktop in an upright orientation.

5. A telescoping monitor mount comprising:
   a center post;
   a slidable bracket over the center post;
   a first telescoping arm connected to the slidable bracket;
   a second telescoping arm connected to the slidable bracket;
   a first monitor mounting bracket connected to an end of the first telescoping arm opposite the slidable bracket; and
   a second monitor mounting bracket connected to an end of the second telescoping arm opposite the slidable bracket,
   wherein the first telescoping arm is curved, and
   wherein the second telescoping arm is curved in the same direction and plane as the first telescoping arm.

6. The telescoping monitor mount of claim 5, wherein the curve of the first telescoping arm and the curve of the second telescoping arm combine to facilitate increase viewing angle adjustability for monitors mounted to the first and second monitor mounting brackets without interference from the first and second telescoping arms.

7. A telescoping monitor mount comprising:
   a center post;
   a slidable bracket over the center post;
   a first telescoping arm connected to the slidable bracket;
   a second telescoping arm connected to the slidable bracket;
   a first monitor mounting bracket connected to an end of the first telescoping arm opposite the slidable bracket; and
   a second monitor mounting bracket connected to an end of the second telescoping arm opposite the slidable bracket,
   wherein the first telescoping arm includes:
      an outer tube;
      an inner tube slidable within the outer tube; and
      a set screw extending through a threaded hold in the outer tube and selectively contacting the inner tube to fix the extension of the inner tube relative to the outer tube,
   wherein the outer tube and the inner tube form a coincident circular curve such that the inner tube slidable within the outer tube along the coincident circular curve.

8. A telescoping monitor mount comprising:
   a center post;
   a slidable bracket over the center post;
   a first telescoping arm connected to the slidable bracket;
   a second telescoping arm connected to the slidable bracket;
   a first monitor mounting bracket connected to an end of the first telescoping arm opposite the slidable bracket;
   a second monitor mounting bracket connected to an end of the second telescoping arm opposite the slidable bracket;
   a first pivot between the first monitor mounting bracket and the first telescoping arm;
   a second pivot between the second monitor mounting bracket and the second telescoping arm;
   a third pivot between the slidable bracket and the first telescoping arm; and
   a fourth pivot between the slidable bracket and the second telescoping arm.

9. A telescoping monitor mount comprising:
   a center post;
   a slidable bracket over the center post;
   a first telescoping arm connected to the slidable bracket;
   a second telescoping arm connected to the slidable bracket;
   a first monitor mounting bracket connected to an end of the first telescoping arm opposite the slidable bracket;
   a second monitor mounting bracket connected to an end of the second telescoping arm opposite the slidable bracket; and
   a third monitor mounting bracket connected to the center post such that the third monitor mounting bracket is between the first monitor mounting bracket and the second monitor mounting bracket.

10. The telescoping monitor mount of claim 9, wherein the third monitor mounting bracket is pivotably connected to the center post.

11. An assembly comprising:
    telescoping monitor mount including:
       a center post;
       a slidable bracket over the center post;
       a first telescoping arm connected to the slidable bracket, wherein the first telescoping arm is curved;
       a second telescoping arm connected to the slidable bracket, wherein the second telescoping arm is curved in the same direction and plane as the first telescoping arm;
       a first monitor mounting bracket connected to an end of the first telescoping arm opposite the slidable bracket; and
       a second monitor mounting bracket connected to an end of the second telescoping arm opposite the slidable bracket;
    a first monitor mounted to the first monitor mounting bracket; and
    a second monitor mounted to the second monitor mounting bracket.

12. The assembly of claim 11, wherein the first telescoping arm includes:

an outer tube;
an inner tube slidable within the outer tube; and
a set screw extending through a threaded hold in the outer tube and selectively contacting the inner tube to fix the extension of the inner tube relative to the outer tube.

13. The assembly of claim 11, further comprising:
a first pivot between the first monitor mounting bracket and the first telescoping arm; and
a second pivot between the first second monitor mounting bracket and the second telescoping arm.

14. An assembly comprising:
telescoping monitor mount including:
 a center post;
 a clamp connected to the post for securing the post to a desktop in an upright orientation;
 a slidable bracket over the center post;
 a first telescoping arm connected to the slidable bracket;
 a second telescoping arm connected to the slidable bracket;
 a first monitor mounting bracket connected to an end of the first telescoping arm opposite the slidable bracket; and
 a second monitor mounting bracket connected to an end of the second telescoping arm opposite the slidable bracket;
a first monitor mounted to the first monitor mounting bracket; and
a second monitor mounted to the second monitor mounting bracket.

15. An assembly comprising:
telescoping monitor mount including:
 a center post;
 a slidable bracket over the center post;
 a first telescoping arm connected to the slidable bracket, wherein the first telescoping arm includes:
  an outer tube;
  an inner tube slidable within the outer tube; and
  a set screw extending through a threaded hold in the outer tube and selectively contacting the inner tube to fix the extension of the inner tube relative to the outer tube,
  wherein the outer tube and the inner tube form a coincident circular curve such that the inner tube slidable within the outer tube along the coincident circular curve:
 a second telescoping arm connected to the slidable bracket;
 a first monitor mounting bracket connected to an end of the first telescoping arm opposite the slidable bracket; and
 a second monitor mounting bracket connected to an end of the second telescoping arm opposite the slidable bracket;
a first monitor mounted to the first monitor mounting bracket; and
a second monitor mounted to the second monitor mounting bracket.

16. An assembly comprising:
telescoping monitor mount including:
 a center post;
 a slidable bracket over the center post;
 a first telescoping arm connected to the slidable bracket;
 a second telescoping arm connected to the slidable bracket;
 a first monitor mounting bracket connected to an end of the first telescoping arm opposite the slidable bracket;
 a second monitor mounting bracket connected to an end of the second telescoping arm opposite the slidable bracket;
 a first pivot between the first monitor mounting bracket and the first telescoping arm;
 a second pivot between the second monitor mounting bracket and the second telescoping arm;
 a third pivot between the slidable bracket and the first telescoping arm; and
 a fourth pivot between the slidable bracket and the second telescoping arm;
a first monitor mounted to the first monitor mounting bracket; and
a second monitor mounted to the second monitor mounting bracket.

17. An assembly comprising:
telescoping monitor mount including:
 a center post;
 a slidable bracket over the center post;
 a first telescoping arm connected to the slidable bracket;
 a second telescoping arm connected to the slidable bracket;
 a first monitor mounting bracket connected to an end of the first telescoping arm opposite the slidable bracket; and
 a second monitor mounting bracket connected to an end of the second telescoping arm opposite the slidable bracket;
 a third monitor mounting bracket connected to the center post such that the third monitor mounting bracket is between the first monitor mounting bracket and the second monitor mounting bracket;
a first monitor mounted to the first monitor mounting bracket;
a second monitor mounted to the second monitor mounting bracket; and
a third monitor mounted to the third monitor mounting bracket.

18. The assembly of claim 17, wherein the third monitor mounting bracket is pivotably connected to the center post.

* * * * *